United States Patent [19]

Kawakami et al.

[11] Patent Number: 5,614,344
[45] Date of Patent: Mar. 25, 1997

[54] TONER FOR DEVELOPING ELECTROSTATIC IMAGES AND IMAGE FORMING METHOD

[75] Inventors: Hiroaki Kawakami, Yokohama; Shinji Doi, Kawasaki; Hirohide Tanikawa; Masatsugu Fujiwara, both of Yokohama; Kazunori Kato, Mitaka, all of Japan

[73] Assignee: Canon Kabushiki Kaisha, Tokyo, Japan

[21] Appl. No.: 489,957

[22] Filed: Jun. 13, 1995

[30]  Foreign Application Priority Data

Jun. 14, 1994  [JP]  Japan .................................. 6-154343

[51] Int. Cl.$^6$ ............................ G03G 13/08; G03G 9/08
[52] U.S. Cl. ............................................ 430/102; 430/110
[58] Field of Search ...................................... 430/102, 110

[56]  References Cited

U.S. PATENT DOCUMENTS

| | | | |
|---|---|---|---|
| 2,297,691 | 10/1942 | Carlson | 430/31 |
| 4,514,485 | 4/1985 | Ushiyama et al. | 430/106.6 |
| 4,965,162 | 10/1990 | Aonuma et al. | 430/110 |
| 5,202,211 | 4/1993 | Vercoulen et al. | 430/109 |
| 5,332,639 | 7/1994 | Nakamura et al. | 430/110 |

FOREIGN PATENT DOCUMENTS

| | | |
|---|---|---|
| 0448946 | 10/1991 | European Pat. Off. . |
| 0586003 | 3/1994 | European Pat. Off. . |
| 42-23910 | 11/1967 | Japan . |
| 43-24748 | 10/1968 | Japan . |
| 58-66951 | 4/1983 | Japan ................................ 430/110 |
| 59-200250 | 11/1984 | Japan ................................ 430/110 |
| 62-184473 | 8/1987 | Japan . |
| 63-36268 | 2/1988 | Japan . |
| 63-146048 | 6/1988 | Japan . |
| 1-273056 | 10/1989 | Japan . |
| 1-49941 | 10/1989 | Japan . |
| 3-68957 | 3/1991 | Japan . |
| 3-68958 | 3/1991 | Japan . |
| 3-68956 | 3/1991 | Japan . |
| 4-24646 | 1/1992 | Japan . |
| 4-124678 | 4/1992 | Japan . |
| 5-119516 | 5/1993 | Japan ................................ 430/110 |
| 5-341558 | 12/1993 | Japan . |

OTHER PUBLICATIONS

Patent Abstracts of Japan, vol. 7, No. 274 (P–241) Dec. 1983.
Patent Abstracts of Japan, vol. 18, No. 178 (P–1717) Mar. 1994.

*Primary Examiner*—Roland Martin
*Attorney, Agent, or Firm*—Fitzpatrick, Cella, Harper & Scinto

[57]  ABSTRACT

A toner for developing electrostatic images contains toner particles containing at least a binder resin and a colorant as well as a fine powder comprised of base particles on which crystalline low resistance tin oxide films are formed. The crystalline low resistance tin oxide contains less than 100 ppm of antimony, arsenic and phosphorus, and has an oxygen deficiency structure. The toner is excellent in strength and can consistently give high quality images under any environmental conditions.

24 Claims, 1 Drawing Sheet

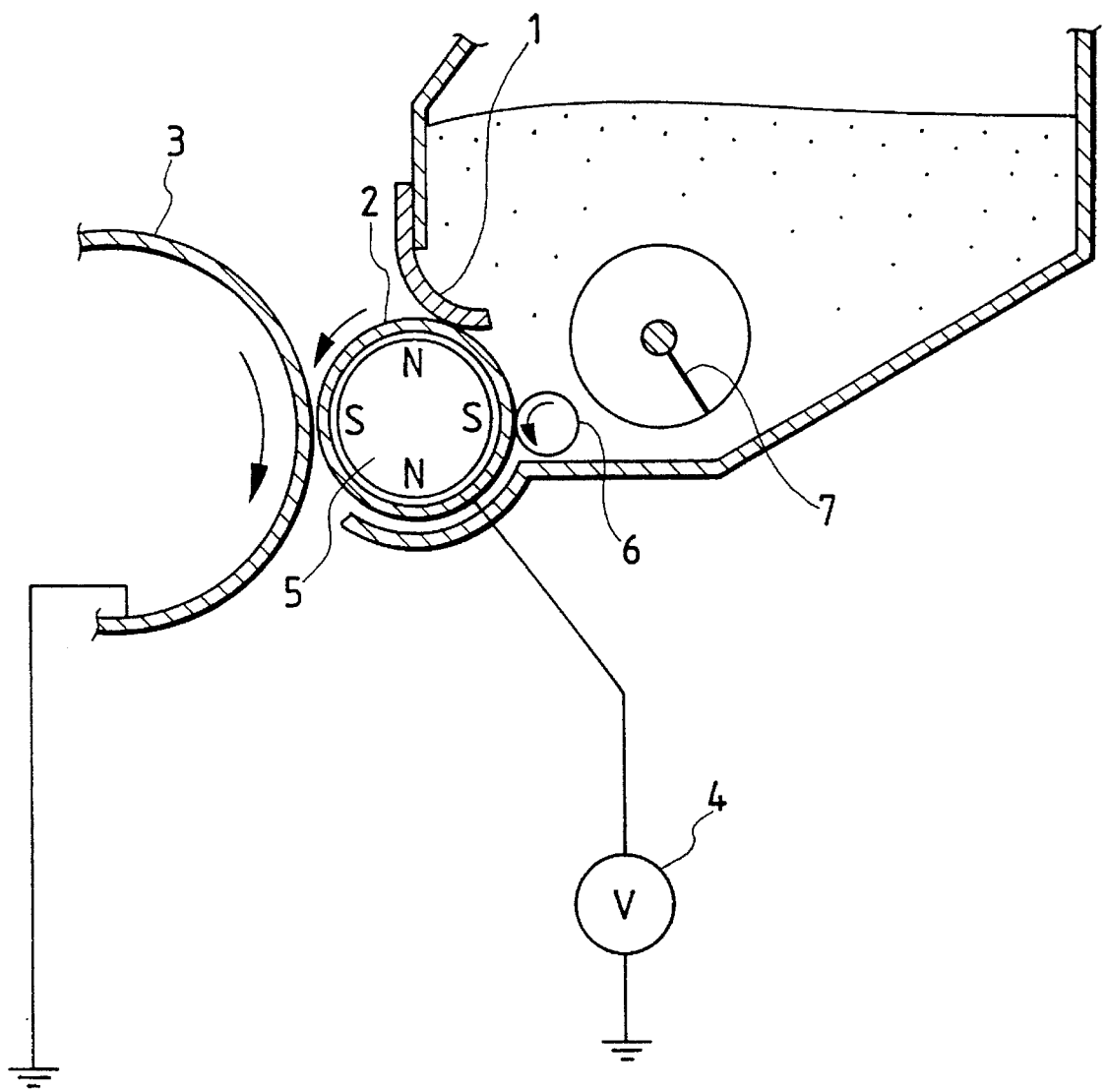

TONER FOR DEVELOPING ELECTROSTATIC IMAGES AND IMAGE FORMING METHOD

BACKGROUND OF THE INVENTION

1. Field of the invention

This invention relates to a toner for developing electrostatic images, and an image forming method, used in electrophotography, electrostatic recording, electrostatic printing or the like.

2. Related Background Art

It is hitherto well known to form an image on the surface of a photoconductive material by an electrostatic means and develop the image. A number of methods are known therefor, as disclosed in U.S. Pat. No. 2,297,691, Japanese Patent Publications No. 42-23910 and No. 43-24748. In general, copies or prints are obtained by forming an electrostatic image on a photosensitive member by utilizing a photoconductive material and by various means, subsequently developing the electrostatic image by the use of a toner to form a toner image, and transferring the toner image to a transfer medium such as paper if necessary, followed by fixing by heat, pressure, heat and pressure, or solvent vapor. The toner which has not transferred to and has remained on the photosensitive member is cleaned by various means, and then the above process is repeated.

As methods for developing electrostatic images, it is common to use two-component development, employing a blend of toner and carrier, or one-component development, employing only a magnetic toner or only a non-magnetic toner. In either case, the toner is triboelectrically charged by means of a triboelectric charging material or member such as a carrier, a sleeve or a blade to obtain charge necessary for the development. In that case, it is known to add a charge control agent to the toner so that the desired charge quantity can be obtained. For example, as those for positively charging the toner, Nigrosine dyes, quaternary ammonium salts, polyamine resins and so forth are known in the art. As those for negatively charging the toner, salicylic acid metal complexes, dialkylsalicylic acid metal complexes, metal-containing azo dyes and so forth are known in the art. When two-component type developers are used, there is a method in which carrier particle surfaces are coated with a charge controllable material to control the changeability of the toner.

Even such a charge-controlled toner, however, may show an increase in charge quantity of the toner to cause a decrease in image density when continuously used for a long time or when continuously used in an environment of low humidity. To settle this problem, methods are proposed in which a low-resistivity material is incorporated into toner. For example, such proposals are disclosed in Japanese Patent Applications Laid-open No. 62-184473, No. 63-36268, No. 63-146048, No. 1-273056, No. 3-68956, No. 3-68957, No. 3-68958, No. 4-24646 and No. 4-124678 and Japanese Patent Publication No. 1-49941. Although the methods disclosed therein can be effective in an environment of low humidity, they have not worked well for maintaining a sufficient charge quantity in an environment of high humidity and cause fog or a decrease in image density in some instances.

To cope with this problem, the method proposed in Japanese Patent Application Laid-open No. 5-341558 employs barium sulfate whose particle surfaces are coated with antimony-doped tin oxide, and is a method that has overcome the above problems.

However, even in the above method, the tin oxide coated on the particle surfaces of barium sulfate may come off when the toner is continuously used for a long time in a developing method where a relatively great force is applied to the toner by an elastic coating blade or the like or when the toner is used in a high-speed process, resulting in lowering of the performance of the toner and also bringing about a problem that the tin oxide having come off contaminates the developing sleeve, coating blade and carrier particle surfaces. This is liable to cause problems of decrease in image density and an increase in fog.

In general, when a fine powder contains a doped low-resistivity material, electrical resistance greatly depends upon temperature so that charge quantity of the toner may be unstable to cause decrease in image density and increase in fog.

SUMMARY OF THE INVENTION

An object of the present invention is to provide a toner for developing electrostatic images and an image forming method, which are capable of forming such high-quality images that image density is high and there is no fogging or toner scatter(or separation).

Another object of the present invention is to provide a toner for developing electrostatic images, and an image forming method, which can stably form high-quality images over a long period of time even if a great stress is applied to the toner.

Still another object of the present invention is to provide a toner for developing electrostatic images, and an image forming method, which are barely affected by temperature and humidity.

To achieve the above objects, the present invention provides a toner for developing an electrostatic image, which comprises:

(a) toner particles containing at least a binder resin and a colorant; and (b) a fine powder having base particles on the surfaces of which coats of crystalline low electrical resistance tin oxide are formed;

wherein said crystalline low electrical resistance tin oxide contains less than 100 ppm of antimony, arsenic and phosphorus and has an oxygen deficiency structure.

The present invention also provides an image forming method comprising;

forming an electrostatic image on an electrostatic image bearing member;

forming a thin layer of a toner on a developer carrying member by means of a coating member pressing the developer carrying member via the toner; and developing the electrostatic image by transferring the toner on the developer carrying member to the electrostatic image bearing member to form a toner image;

wherein said toner comprises:

(a) toner particles containing at least a binder resin and a colorant; and (b) a fine powder having base particles on the surfaces of which coats of crystalline low electrical resistance tin oxide are formed;

said crystalline low electrical resistance tin oxide containing less than 100 ppm of antimony, arsenic and phosphorus and having an oxygen deficiency structure.

BRIEF DESCRIPTION OF THE DRAWINGS

The FIGURE is a schematic illustration of a developing assembly capable of carrying out the image forming method of the present invention.

DESCRIPTION OF THE PREFERRED EMBODIMENTS

The toner of the present invention contains a fine powder comprised of base particles on the surfaces of which crystalline tin oxide coats with low electrical resistance are formed. When the tin oxide forms coats in a crystalline state, the particles can have a superiority in strength. Hence, the toner can well maintain the initial state even in its continuous use in such a state that a load is applied to the toner. The more crystallized the low electrical resistance tin oxide is, the smaller the surface activity is. Hence, the fine powder has less water adsorption and can prevent the charge quantity of the toner from lowering in an environment of high humidity.

The crystallinity is judged on X-ray diffraction spectra formed using Ka rays of X-rays specific to Cu as a radiation source. As a measuring device, it is possible to use, for example, a high-intensity full-automatic X-ray diffractometer MXP18 (manufactured by MacScience Co.). When the low electrical resistance tin oxide is crystalline, a sharp peak is observed. When it is amorphous, a broad peak is formed.

In the present invention, each of the contents of antimony, arsenic and phosphorus in the crystalline low electrical resistance tin oxide is less than 100 ppm and must have an oxygen deficiency structure, containing substantially no doping elements. What is herein meant by the "content" is a weight proportion of the respective metal elements with respect to the total weight of tin oxide, including doping metals or doping metal oxides. The degree of oxygen deficiency includes at most the range represented by $SnO_{1.998}$, with respect to the stoichiometrically perfect structure $SnO_2$. If the low electrical resistance tin oxide has been reduced more than that, it can no longer maintain the crystalline state of $SnO_2$, resulting in decrease in crystallinity to enable no achievement of sufficient low electrical resistance.

When tin oxide coats are formed on the surfaces of base particles, they are formed by deposition from a solution (what is called epitaxial growth), and hence the crystallinity is maintained. This ensures a strong binding power between the coats and the surfaces of base particles to enable strong coating with tin oxide. Where, however, doped with antimony, arsenic and phosphorus so as to achieve low electrical resistance, they must be doped in a content not less than 1,000 ppm, and preferably from 10,000 ppm to 100,000 ppm (1 to 10% by weight), in order to achieve sufficient low electrical resistance. In such a case, the crystallinity becomes lower to make coat strength insufficient, and hence continuous development for a long time raises problems such as decrease in image density and increase in fog.

Moreover, where doped with antimony, arsenic and phosphorus so as to achieve a low electrical resistance, the electrical resistance has great temperature dependence (especially the coefficient of resistivity-temperature at from a low temperature to about 50° C. is greater than non-doped ones), and also is liable to be affected by other environmental or atmospheric factors. For example, the conductivity of fine powder may vary because of a trace quantity of ozone produced in the course of charging or oil mist produced in the course of fixing to change the electrical resistance of the fine powder, resulting in an unstable charge quantity of the toner to cause decrease in image density and increase in fog.

As the base particles, various fine metal particles, fine metal oxide particles, fine particles of salts, fine ceramic particles, fine resin particles may be used. Fine barium sulfate particles and, fine alumina particles, fine titanium oxide particles and fine silica particles are preferred. Fine barium sulfate particles are more preferred. The fine barium sulfate particles are excellent in the aspect of their binding strength to the crystalline tin oxide having an oxygen deficiency structure, and are also good from a viewpoint of coat uniformity. Especially in the case of toners for full-color image formation, the use of such fine barium sulfate particles can promise good transparency of fixed images formed on transparent sheets for overhead projectors (OHP). Such base particles may preferably have an average particle diameter of 1.5 µm or smaller, and more preferably from 0.05 to 0.9 µm.

The fine particles which have as their surfaces the coats of low electrical resistance tin oxide having an oxygen deficiency structure have been formed may preferably have a volume resistivity of $1\times10^8$ Ω·cm or lower, and more preferably from 1 Ω·cm to $1\times10^6$ Ω·cm. If the volume resistivity is higher than $1\times10^8$ Ω·cm, it becomes less effective to prevent image density from lowering because of increase in charge quantity of the toner during its continuous use in an environment of low humidity. In order to achieve the above preferable volume resistivity, the crystalline tin oxide may be imparted to the base particles in an amount of from 20/n to 320/n % by weight, where n represents a true specific gravity of the base particles.

AS methods for forming the coats of low electrical resistance tin oxide, the coats may preferably be formed in the following manner: Fine particles serving as the base particles are dispersed in a mineral acid solution of a hydrolyzable tin compound. Thereafter, the pH is raised and the tin compound is hydrolyzed so that the surfaces of the fine particles are coated with tin hydroxide deposited on the fine particle surfaces. The resulting fine particles are calcined in an environment with a controlled oxygen concentration to form crystalline low electrical resistance coats having an oxygen deficiency structure. In order to increase the crystallinity of the coats, the calcination may preferably be carried out at a temperature as high as possible. However, too high temperatures may cause lowering of adhesion between the base particles and the coats because of thermal expansion of the base particles, resulting in breaks of the base particles. Tin oxide coats containing no doping elements can be readily crystallized and hence it is unnecessary to make the calcination temperature so high. In the present invention, the coats may be doped with antimony, arsenic and phosphorus in an amount of from 0 to less than 100 ppm. With regard to other elements, e.g., indium, niobium and tantalum, there are no particular limitations on the amount of doping. However, referring to doping with those elements, it is preferred that the surfaces of base particles are coated with the tin hydroxide at the time of deposition from the solution and thereafter the doping elements are added or doping element hydroxide coats are formed.

The coats may also be formed by a method utilizing mechanofusion or by spray drying, which, however, are inferior in coat strength.

The toner particles may have a weight average particle diameter of from 2 to 10 µm, and preferably from 3 to 9 µm.

The binder resin used in the toner of the present invention may include polystyrene, poly-α-methylstyrene, a styrenepropylene copolymer, a styrene-butadiene copolymer, a styrene-vinyl chloride copolymer, a styrene-vinyl acetate copolymer, a styrene-acrylate copolymer, a styrene-methacrylate copolymer, vinyl chloride resins, polyester resins, epoxy resins, phenol resins and polyurethane resins, any of which may be used alone or in the form of a mixture. In particular, a styrene-acrylate copolymer, a styrene-methacrylate copolymer and polyester resins, or mixed resins of any of these are preferred.

As the colorant used in the toner of the present invention, pigments, dyes or mixtures thereof may be used.

They may include, for example, carbon black; oil-soluble dyes such as C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163, 202, 206, 207, 209, C.I. Pigment Violet 19, C.I. Vat Red 1, 2, 10, 13, 15, 23, 29, 35, C.I. Solvent Red 1, 3, 8, 23, 24, 25, 27, 30, 49, 81, 82, 83, 84, 100, 109, 121, C.I. Disperse Red 9, C.I. Solvent Violet 8, 13, 14, 21, 27, and C.I. Disperse Violet 1; basic dyes such as C.I. Basic Red 1, 2, 9, 12, 13, 14, 15, 17, 18, 22, 23, 24, 27, 29, 32, 34, 35, 36, 37, 38, 39, 40, and C.I. Basic Violet 1, 3, 7, 10, 14, 15, 21, 25, 26, 27, 28; C.I. Pigment Yellow 1, 2, 3, 4, 5, 6, 7, 10, 11, 12, 13, 14, 15, 16, 17, 23, 65, 73, 83; C.I. vat Yellow 1, 3, 20; C.I. Pigment Blue 2, 3, 15, 16, 17; C.I. Vat Blue 6; C.I. Acid Blue 45, or copper phthalocyanine pigments whose phthalocyanine skeleton has been substituted with 1 to 5 phthalimide methyl group(s) as represented by the formula (1):

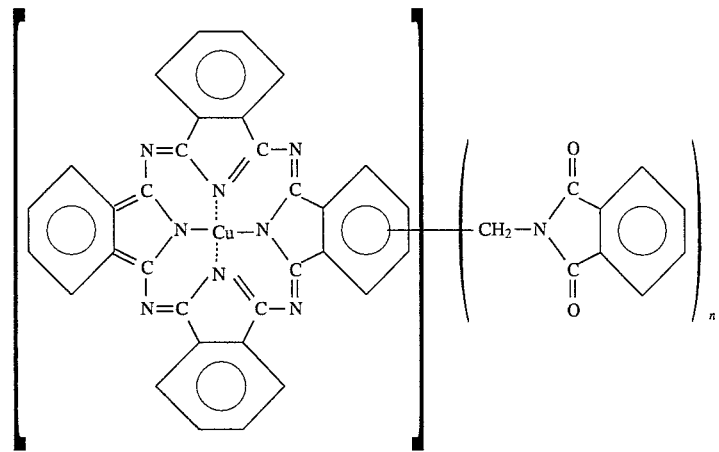

(In the formula, n represents 1 to 5)

Any of these may be used alone or in the form of a mixture.

The colorant may be used in an amount of from 0.1 to 60 parts by weight, and preferably from 0.5 to 50 parts by weight, based on 100 parts by weight of the binder resin.

When the toner of the present invention is controlled to be positively chargeable, a charge control agent used may include Nigrosine dyes; Nigrosine-modified products, modified with a fatty acid metal salt; quaternary ammonium salts such as tributylbenzylammonium 1-hydroxy-4-naphthosulfonate and tetrabutylammonium teterafluoroborate, and onium salts thereof such as phosphonium salts, and lake pigments thereof; triphenyl methane dyes and lake pigments of these (lake-forming agents may include phosphotungstic acid, phosphomolybdic acid, phosphotungstomolybdic acid, tannic acid, lauric acid, gallic acid, ferricyanides and ferrocyanides); amine and polyamine compounds; metal salts of higher fatty acid; acetylacetone metal complexes; diorganotin oxides such as dibutyltin oxide, dioctyltin oxide and dicyclohexyltin oxide; and diorganotin borates such as dibutyltin borate, dioctyltin borate and dicyclohexyltin borate. When controlled to be negatively chargeable, an organic metal compound or a chelate compound may be used, including, for example, monoazo metal complexes, acetylacetone metal complexes, metal complexes of aromatic hydroxycarboxylic acids, and metal complexes of aromatic dicarboxylic acids, and besides including aromatic hydroxycarboxylic acids, aromatic mono- or polycarboxylic acids, and metal salts, anhydrides or esters of these, and phenol derivatives such as bisphenol. Any of these charge control agents may be used in an amount of from 0.1 to 15 parts by weight, and preferably from 0.5 to 10 parts by weight, based on 100 parts by weight of the binder resin.

A release agent may optionally be added to the toner of the present invention. It may include, for example, aliphatic hydrocarbon waxes or oxides thereof such as low-molecular weight polyethylene, low-molecular weight polypropylene, paraffin wax and Fischer-Tropsch wax; waxes mainly composed of a fatty acid ester, such as carnauba wax and montanic acid ester wax, or those obtained by subjecting part or the whole thereof to deoxydation treatment; saturated straight-chain fatty acids such as palmitic acid, stearic acid and montanic acid; unsaturated fatty acids such as brassidic acid, eleostearic acid and parinaric acid; saturated alcohols such as stearyl alcohol, aralkyl alcohol, behenyl alcohol, carnaubyl alcohol, ceryl alcohol and melissyl alcohol; polyhydric alcohols such as sorbitol; fatty acid amides such as linoleic acid amide; saturated fatty acid bisamides such as methylene-bis(stearic acid amide); unsaturated fatty acid bisamides such as ethylene-bis(oleic acid amide); aromatic bisamides such as N,N'-distearylisophthalic acid amide; fatty acid metal salts such as zinc stearate; grafted waxes obtained by grafting vinyl monomers such as styrene to fatty acid hydrocarbon waxes; partially esterified products of polyhydric alcohols with fatty acids, such as monoglyceride behenate; and methyl esterified product having a hydroxyl group, obtained by hydrogenation of vegetable fats and oils. The release agent may be added in an amount of from 0.1 to 20 parts by weight, and preferably from 0.5 to 10 parts by weight, based on 100 parts by weight of the binder resin.

When the toner of the present invention is used as a magnetic toner, a magnetic material is added to the toner particles. Such a magnetic material may include iron oxides such as magnetite, hematite and ferrite; metals such as Fe, Co and Ni, or alloys of any of these metals with any of metals such as Al, Co, Cu, Pb, Ni, Sn, Zn, Sb, Be, Bi, Cd, Ca, Mn, Se, Ti, W and V, and mixtures of any of these. These magnetic materials may preferably be those having an average particle diameter of from 0.1 to 2 µm, and a coercive force (Hc) of from 1.6 to 24 kA/m, a saturation magnetization ($\sigma$s) of from 50 to 200 Am²/kg and a residual magnetization ($\sigma$r) of from 2 to 20 Am²/kg, as magnetic properties under application of 800 kA/m.

When the toner of the present invention is used in a two-component type developer, the toner is blended with carrier particles. As materials constituting the carrier particles, it is possible to use metals such as iron, nickel, copper, zinc, cobalt, manganese, chromium and rare earth elements, alloys or oxides of any of these, and magnetic ferrite. Coat layers may be formed on the surfaces of carrier particles. Materials for such coating may include silicone resins, fluorine resins, melamine resins, styrene resins and acrylic resins, or copolymer resins of any of these. These resins may be used alone or in the form of a mixture.

The fine powder having base particles on which the crystalline low electrical resistance tin oxide coats are formed may preferably be added in an amount of from 0.01 to 5 parts by weight, and preferably from 0.05 to 2 parts by weight, based on 100 parts by weight of the toner particles. If it is added in an amount less than 0.01 part by weight, the addition of the low electrical resistance fine powder can be less effective, tending to cause fog or decrease in image density in an environment of low humidity. If it is added in an amount more than 5 parts by weight, the toner may have too low electrical resistance, tending to cause fog in an environment of high humidity.

In addition to the low electrical resistance fine powder described above, inorganic fine powder such as fine silica powder or fine aluminum powder may be externally added. The inorganic fine powder may preferably have a BET specific surface area of from 20 m²/g to 400 m²/g. The inorganic fine powder may be treated with a surface treating agent. The surface treating agent may include silane coupling agents, titanium coupling agents and silicone oils. The inorganic fine powder may preferably be those treated with a silane coupling agent or a silicone oil. The inorganic fine powder may be surface-treated with both a silane coupling agent and a silicone oil. The above inorganic fine powder may be added in an amount of from 0.05 to 5 parts by weight, and more preferably from 0.1 to 3 parts by weight, based on 100 parts by weight of the toner particles.

The toner of the present invention can be most effective especially in an image forming method having a developing system as described below. The developing system has the step of developing an electrostatic image formed on an electrostatic image bearing member, with the toner applied in a thin layer on a developer carrying member by means of a coating member brought into touch with the developer carrying member through the toner. As the coating member for applying the toner in thin layer, there may by used a blade or roller whose surface is formed of metal, resin or rubber. The individual toner particles are uniformly charged by the coating member and hence good images with less fog can be formed. Although the stress given to the toner from the coating member is larger than that in other developing systems, the fine powder having the crystalline tin oxide coats with an oxygen deficiency structure, is very large in coat strength so that the toner can maintain good results even when used in the above developing system and the system is continuously driven for a long time.

Methods for measuring the properties concerning the toner of the present invention will be described below.
(1) Measurement of particle diameters of the base particles and the fine powder:

Samples are photographed using an electron microscope. The photograph is taken at 60,000 magnifications. If it is difficult to do so, a photograph taken at a lower magnification is enlarged so as to be 60,000 magnifications. On the photograph, particle diameters of primary particles are measured. Here, a major axis and a minor axis are measured, and a value obtained by averaging the measurements is regarded as particle diameter. This is measured for 100 particles, and a 50% value of the measurements is regarded as average particle diameter.

(2) Measurement of electrical resistance:

Samples are put in an aluminum cylinder of 40 mm diameter, and press-molded under 2,500N to measure the volume resistivity of the molded product by means of a resistivity meter LOW-RESTAR AP or HI-RESTAR IP (manufactured by Mitsubishi Petrochemical Engineering Co., Ltd.), using four probes. Samples having a volume resistivity of $1 \times 10^6$ $\Omega$·cm or lower are measured using LOW-RESTAR AP, and those having a volume resistivity higher than that are measured using HI-RESTAR IP. The measurement is made in an environment of temperature 20° to 25° C. and humidity 50 to 60% RH.

(3) Measurement of magnetic properties:

Measurement is made using a vibrating sample type magnetic force meter VSM-3S-15 (manufactured by Toei Kogyo) under an external magnetic field of 800 kA/m.

(4) Measurement of BET specific surface area:

According to the BET method, nitrogen gas is adsorbed on sample surfaces using a specific surface area measuring device AUTOSOBE 1 (manufactured by Yuasa Ionics Co.), and the specific surface area is calculated by the BET multiple point method.

The present invention will be described below in detail by giving Examples. Particle diameter of toner is indicated as weight average particle diameter measured using a Coulter counter Multisizer II (manufactured by Coulter Electronics Co.) and on the basis of weight calculated from volume distribution.

| Example 1 | *by weight |
| --- | --- |
| Binder resin (polyester resin; weight average molecular weight: 18,000) | 100 parts* |
| Colorant (carbon black) | 7 parts* |
| Release agent (low-molecular weight polyethylene) | 4 parts* |
| Negative charge control agent (monoazo metal complex) | 3 parts* |

The above materials were mixed using a Henschel mixer, and the mixture was melt-kneaded by means of a twin-screw extruder. Thereafter, the kneaded product was crushed with a hammer mill, and then the crushed product was finely pulverized by means of a jet mill. The finely pulverized powder was air-classified to obtain negatively chargeable non-magnetic black toner particles with a weight average particle diameter of 8.5 µm.

Fine barium sulfate powder (base particles) with an average particle diameter of 0.1 µm and a true specific gravity of 4.4 was suspended in water, and the suspension was adjusted to pH 2 using hydrochloric acid. A tin tetrachloride solution was further added thereto, and the mixture obtained was stirred, followed by addition of sodium hydroxide to adjust the pH to 11. At this stage, solid matter was separated, and was calcined in an environment with an oxygen concentration controlled so as to provide an oxygen deficiency structure, to obtain fine powder A (average particle diameter: 0.12 μm) comprised of fine barium sulfate particles surface-coated with the crystalline low electrical resistance tin oxide having an oxygen deficiency structure. Particles of the fine powder A were coated with the low electrical resistance tin oxide in an amount of 32% by weight based on the weight of the base particles, and had a volume resistivity of $3.8 \times 10^3$ Ω·cm.

In the coating treatment made in the manner described above, none of antimony, arsenic and phosphorus were added and hence the content of these elements was substantially zero (0).

Meanwhile, 100 parts by weight of particles of fine silica powder with a BET specific surface area of 200 $m^2/g$ were surface-treated with 15 parts by weight of hexamethyldisilazane and 10 parts by weight of dimethylsilicone oil to prepare a negatively chargeable hydrophobic fine silica powder.

Then, 100 parts by weight of the negatively chargeable non-magnetic black toner particles, 0.2 part by weight of the fine barium sulfate powder A coated with low electrical resistance tin oxide coated, and 0.8 part by weight of the negatively chargeable hydrophobic fine silica powder were blended to produce a negatively chargeable non-magnetic black toner.

This non-magnetic black toner was put into a modified machine of a laser beam printer Laser Jet III Si (trade name; manufactured by Hulett Packard Co.) so modified as to be adapted to non-magnetic toner and having a toner feeding roller and a toner coating blade made of urethane rubber, where printing was performed by one-component non-magnetic toner development, and a running evaluation test was made for the toner while replenishing the toner.

Results obtained are shown in Table 2.

Example 2

Fine titanium oxide powder B coated with low electrical resistance tin oxide (an average particle diameter of 0.12 μm) was prepared in the same manner as in Example 1 except that a fine titanium oxide powder with an average particle diameter of 0.1 μm (true specific gravity: 4.1) was used as the base particles. Particles of this fine powder B were coated with the low electrical resistance tin oxide in an amount of 39% by weight based on the weight of the base particles, and had a volume resistivity of $5.6 \times 10^2$ Ω·cm.

Meanwhile, 100 parts by weight of fine alumina powder with a BET specific surface area of 50 $m^2/g$ were surface-treated with 6 parts by weight of dimethylsilicone oil to prepare a negatively chargeable hydrophobic fine alumina powder.

Then, 100 parts by weight of negatively chargeable non-magnetic black toner particles prepared in the same manner as in Example 1, 0.3 parts by weight of the fine titanium oxide powder B coated with low electrical resistance tin oxide and 1.0 part by weight of the negatively chargeable hydrophobic fine alumina powder were blended to produce a negatively chargeable non-magnetic black toner.

Using the non-magnetic black toner obtained, a running evaluation test was made in the same manner as in Example 1.

Results obtained are shown in Table 2.

Examples 3 to 8

Fine barium sulfate powders coated with low electrical resistance tin oxide were obtained in the same manner as in Example 1 except that average particle diameters of the fine barium sulfate powders were changed to 2 μm, 1.2 μm, 0.5 μm and 0.01 μm, respectively. The coverage (coat weight) and the oxygen concentration at the time of calcination were controlled so that the fine barium sulfate powders (C to F) coated with low electrical resistance tin oxide had a volume resistivity of $2.0 \times 10^2$ Ω·cm.

In addition, the coverage of the low resistance tin oxide was changed to prepare the fine powder (G) with a volume resistivity of $2.5 \times 10^{10}$ Ω·cm and the fine powder (H) with a volume resistivity of $1.3 \times 10^{-2}$ Ω·cm.

The coverage and volume resistivity of these fine powders (C to H) are shown in Table 1 below.

TABLE 1

| | Fine powder | Average particle diameter of base particles (μm) | Coverage with respect to base particles (wt. %) | Volume resistivity (Ω · cm) |
|---|---|---|---|---|
| Example: | | | | |
| 3 | C | 2.0 | 18 | $2.0 \times 10^3$ |
| 4 | D | 1.2 | 22 | $2.0 \times 10^3$ |
| 5 | E | 0.5 | 27 | $2.0 \times 10^3$ |
| 6 | F | 0.01 | 37 | $2.0 \times 10^3$ |
| 7 | G | 0.5 | 8 | $2.5 \times 10^{10}$ |
| 8 | H | 0.5 | 51 | $1.3 \times 10^{-2}$ |

Meanwhile, 100 parts by weight of particles of fine silica powder with a BET specific surface area of 150 $m^2/g$ were surface-treated with 8 parts by weight of hexamethyldisilazane to prepare a negatively chargeable hydrophobic fine silica powder.

Then, 100 parts by weight of negatively chargeable non-magnetic black toner particles prepared in the same manner as in Example 1, 0.2 part by weight of the fine powders C to H each and 0.6 part by weight of the negatively chargeable hydrophobic fine silica powder were blended to produce 6 kinds of negatively chargeable non-magnetic black toners.

Using the six kinds of non-magnetic black toners obtained, running evaluation tests were made in the same manner as in Example 1.

Results obtained are shown in Table 2.

| Example 9 | *by weight |
|---|---|
| Styrene-butyl acrylate copolymer (weight average molecular weight: 300,000) | 100 parts* |
| Magnetic material (average particle diameter: 0.2 μm; Hc: 4.5 kA/m; σs: 110 $Am^2/kg$; σr: 5 $Am^2/kg$) | 80 parts* |
| Low-molecular weight polypropylene | 3 parts* |
| Positive charge control agent (triphenylmethane dye) | 2 parts* |

The above materials were mixed using a Henschel mixer, and the mixture was melt-kneaded by means of a twin-screw extruder. Thereafter, the kneaded product was crushed with a hammer mill, and then the crushed product was finely pulverized by means of a jet mill. The finely pulverized powder was air-classified to obtain positively chargeable magnetic toner particles with a weight average particle diameter of 8.0 μm.

Low electrical resistance fine powder I with an average particle diameter of 0.31 μm was obtained in the same manner as in Example 1 except that a fine barium sulfate powder with an average particle diameter of 0.3 μm was used as the base particles. This fine powder I was comprised of base particles surface-coated with 24% by weight of the low electrical resistance tin oxide, and had a volume resistivity of $6.4 \times 10^4$ Ω·cm.

Meanwhile, 100 parts by weight of particles of fine silica powder with a BET specific surface area of 130 m²/g were surface-treated with 13 parts by weight of amino-modified silicone oil to prepare a positively chargeable hydrophobic fine silica powder.

Then, 100 parts by weight of the positively chargeable magnetic toner particles, 0.1 part by weight of the fine powder I and 0.9 part by weight of the positively chargeable hydrophobic fine silica powder were blended to produce a positively chargeable magnetic toner.

A developing assembly of a copying machine NP-6030 (manufactured by Canon Inc.) was modified in the manner that an elastic blade 1 whose surface is made of silicone rubber comes into touch with a sleeve 2 as shown in Figure. In Figure, reference numeral 3 denotes a photosensitive drum; 4, a bias applying means; 5, a stationary magnet; 6, a toner feeding roller; and 7, an agitating means for agitating the toner. Using this modified copying machine, a running test was made for the above positively chargeable magnetic toner.

Results obtained are shown in Table 2.

| Example 10 | *by weight |
| --- | --- |
| Polyester resin (weight average molecular weight: 18,000) | 100 parts* |
| Magnetic material | 90 parts* |
| Low-molecular weight polypropylene | 4 parts* |
| Monoazo metal complex | 4 parts* |

The above materials were mixed using a Henschel mixer, and the mixture was melt-kneaded by means of a twin-screw extruder. Thereafter, the kneaded product was crushed with a hammer mill, and then the crushed product was finely pulverized by means of a jet mill. The finely pulverized powder was air-classified to obtain negatively chargeable magnetic toner particles with a weight average particle diameter of 9.0 μm.

Low electrical resistance fine powder J was obtained in the same manner as in Example 1 except that a fine barium sulfate powder with an average particle diameter of 0.7 μm was used as the base particles. This fine powder J was comprised of base particles surface-coated with 20% by weight of the low electrical resistance tin oxide, and had a volume resistivity of $1.1 \times 10^5$ Ω·cm.

Meanwhile, 100 parts by weight of particles of fine titanium oxide powder with a BET specific surface area of 90 m²/g were surface-treated with 10 parts by weight of isobutyltrimethoxysilane to prepare a negatively chargeable hydrophobic fine titanium oxide powder.

Then, 100 parts by weight of the negatively chargeable magnetic toner particles, 0.5 part by weight of the fine powder J and 0.5 part by weight of the negatively chargeable hydrophobic fine titanium oxide powder were blended to produce a negatively chargeable magnetic toner.

Using a copying machine NP-6060 (manufactured by Canon Inc.), a running evaluation test was made for the negatively chargeable magnetic toner.

Results obtained are shown in Table 2.

Example 11

Using a hybridizer (manufactured by Nara Kikai), coats of crystalline low electrical resistance tin oxide having an oxygen deficiency structure were formed on particles of a fine polymethyl methacrylate polymer (PMMA) powder with an average particle diameter of 0.1 μm and a true specific gravity of 1.1 to obtain a low electrical resistance fine powder K having a volume resistivity of $2.3 \times 10^2$ Ω·cm. This fine powder K having a average particle diameter of 0.12 μm, was comprised of base particles surface-coated with 60% by weight of the low electrical resistance tin oxide.

Meanwhile, 100 parts by weight of particles of fine silica powder with a BET specific surface area of 200 m²/g were surface-treated with 15 parts by weight of amino-modified silicone oil to prepare a positively chargeable hydrophobic fine silica powder.

Then, 100 parts by weight of a positively chargeable magnetic toner particles prepared in the same manner as in Example 9, 0.1 part by weight of the fine powder K and 0.9 part by weight of the positively chargeable hydrophobic fine silica powder were blended to produce a positively chargeable magnetic toner.

Using a copying machine NP-6030 (manufactured by Canon Inc.), a running evaluation test was made for the positively chargeable magnetic toner.

Results obtained are shown in Table 2.

Example 12

Using the same copying machine as used in Example 9, a running evaluation test was made for the positively chargeable magnetic toner prepared in Example 11.

Results obtained are shown in Table 2.

Example 13

| | *by weight |
| --- | --- |
| Formulation of Cyan Toner | |
| Polyester resin (weight average molecular weight: 18,000) | 100 parts* |
| Copper phthalocyanine pigment | 6 parts* |
| Metal complex of di-t-butylsalicylic acid | 4 parts* |
| Formulation of Yellow Toner | |
| Polyester resin (weight average molecular weight: 18,000) | 100 parts* |
| Disazo yellow pigment | 4.5 parts* |
| Metal complex of di-t-butylsalicylic acid | 4 parts* |
| Formulation of Magenta Toner | |
| Polyester resin (weight average molecular weight: 18,000) | 100 parts* |
| Quinacridone magenta pigment | 6 parts* |
| Metal complex of di-t-butylsalicylic acid | 4 parts* |
| Formulation of Black Toner | |
| Polyester resin (weight average molecular weight: 18,000) | 100 parts* |
| Carbon black pigment | 6 parts* |
| Metal complex of di-t-butylsalicylic acid | 4 parts* |

The above materials were mixed using a Henschel mixer, and the mixture was melt-kneaded by means of a three-roll kneader. Thereafter, the kneaded product was crushed with a hammer mill, and then the crushed product was finely pulverized by means of a jet mill. The finely pulverized powder was air-classified to obtain cyan toner particles, yellow toner particles, magenta toner particles and black toner particles each having a weight average particle diameter of 8.5 μm.

Low electrical resistance fine powder L was obtained in the same manner as in Example 1 except that a fine barium sulfate powder with an average particle diameter of 0.4 μm was used as the base particles. This fine powder L was comprised of base particles surface-coated with 45% by weight of the low electrical resistance tin oxide, and had a volume resistivity of $8.3 \times 10^0$ Ω·cm.

Meanwhile, 100 parts by weight of particles of fine titanium oxide powder with a BET specific surface area of 110 m$^2$/g were surface-treated with 14 parts by weight of dimethyldimethoxysilane to prepare a negatively chargeable hydrophobic fine titanium oxide powder.

Then, 100 parts by weight of each of color toner particles, 0.3 part by weight of the fine powder L and 1.0 part by weight of the negatively chargeable hydrophobic fine titanium oxide powder were blended to produce each color toner. Each color toner was blended with magnetic ferrite carrier particles surface-coated with silicone resin, in a weight proportion of 8:100 to produce a two-component type developer.

Using a full-color copying machine Color Laser Copia 500 (manufactured by Canon Inc.), a running evaluation test was made for the two-component type developers in four different colors, which were used as starting developers, while replenishing the above toners in four different colors.

Results obtained are shown in Table 2.

Example 14

To 100 parts by weight of cyan toner particles prepared in the same manner as in Example 13, 2.5 parts by weight of only the low electrical resistance fine powder L, prepared in the same manner as in Example 12, was externally added to obtain a cyan toner. A two-component type developer was produced in the same manner as in Example 13.

Using a full-color copying machine Color Laser Copia 500 (manufactured by Canon Inc.), a running evaluation test was made for this two-component type developer, which was used as a starting developer, while replenishing the above cyan toner.

Results obtained are shown in Table 2.

Example 15

Low electrical resistance fine powder M with a volume resistivity of $4.2 \times 10^1$ Ω·cm was obtained in the same manner as in Example 1 except that a fine titanium oxide powder with an average particle diameter of 0.4 μm was used as the base particles. This low electrical resistance fine powder M was comprised of base particles surface-coated with 42% by weight of the low electrical resistance tin oxide.

To 100 parts by weight of cyan toner particles prepared in the same manner as in Example 13, 2.5 parts by weight of only the above low electrical resistance fine powder M was externally added to obtain a cyan toner. A two-component type developer was produced in the same manner as in Example 13.

Using a full-color copying machine Color Laser Copia 500 (manufactured by Canon Inc.), a running evaluation test was made for this two-component type developer, which was used as a starting developer, while replenishing the above cyan toner.

Results obtained are shown in Table 2.

Example 16

The low electrical resistance fine powder A of Example 1 was left standing in a 50° C. thermostatic chamber for 10 days and thereafter taken out of it. The low electrical resistance fine powder A thus left had a volume resistivity of $4.3 \times 10^3$ Ω·cm, and showed little change even after standing at 50° C. for 10 days. A toner was obtained in the same manner as in Example 1 except for using this fine powder A.

A running evaluation test was made for this toner in the same manner as in Example 1 while replenishing the toner.

Results obtained are shown in Table 2.

Comparative Example 1

Fine barium sulfate powder with an average particle diameter of 0.1 μm was suspended in water, and the suspension was adjusted to pH 2 using hydrochloric acid. A tin tetrachloride solution was further added thereto, and the mixture obtained was stirred, followed by addition of sodium hydroxide to adjust the pH to 11. Hydrochloric acid was further added to adjust the pH to 2, followed by addition of a hydrochloric acid solution of antimony trichloride and a sodium hydroxide solution. At this stage, solid matter was separated, and was calcined to obtain fine barium sulfate powder (a) on the particle surfaces of which antimony-doped tin oxide coats were formed. The fine powder (a) was comprised of particles treated with low electrical resistance tin oxide having 60,000 ppm (6% by weight) of antimony, in an amount of 45% by weight based on the weight of the base particles, and had a volume resistivity of 3.0 Ω·cm. Meanwhile, 100 parts by weight of particles of fine titanium oxide powder with a BET specific surface area of 95 m$^2$/g were surface-treated with 10 parts by weight of dimethylsilicone oil to prepare a negatively chargeable hydrophobic fine titanium oxide powder.

Then, 100 parts by weight of toner particles prepared in the same manner as in Example 1, 0.4 part by weight of the fine powder (a) and 1.0 part by weight of the negatively chargeable hydrophobic fine titanium oxide powder were blended to produce a toner. Using the toner obtained, a running evaluation test was made in the same manner as in Example 1 while replenishing the toner.

Results obtained are shown in Table 3.

Comparative Example 2

Fine barium sulfate powder (b) on the particle surfaces of which antimony-doped tin oxide coats were formed was obtained in the same manner as in Comparative Example 1. The fine powder (b) was comprised of base particles treated with low electrical resistance tin oxide having 30,000 ppm (3% by weight) of antimony, in an amount of 54% by weight based on the weight of the base particles, and had a volume resistivity of $1.0 \times 10^1$ Ω·cm. To 100 parts by weight of toner particles prepared in the same manner as in Example 9, 0.9 part by weight of hydrophobic fine silica powder prepared in the same manner as in Example 9 and 0.2 part by weight of the above low electrical resistance fine powder (b) were externally added to obtain a toner.

Using a copying machine NP-6030 (manufactured by Canon Inc.), a running evaluation test was made for this toner.

Results obtained are shown in Table 3.

Comparative Example 3

Using the same copying machine as used in Example 9, a running evaluation test was made for the same toner as used in Comparative Example 2.

Results obtained are shown in Table 3.

Comparative Example 4

The low electrical resistance fine powder (b) of Comparative Example 2 was left standing in a 50° C. thermostatic chamber for 10 days and thereafter taken out of it. The low electrical resistance fine powder (b) thus left had a volume resistivity of $5.7 \times 10^7$ Ω·cm, and showed a great change in volume resistivity after standing at 50° C. for 10 days. A toner was obtained in the same manner as in Comparative Example 2 except for using this fine powder (b).

Using a copying machine NP-6030 (manufactured by Canon Inc.), a running evaluation test was made for this toner.

Results obtained are shown in Table 3.

Comparative Example 5

Fine powder (c) comprised of particles treated with tin oxide containing 1,000 ppm of antimony, in an amount of 45% by weight based on the weight of base Barium sulfate particles, was obtained in the same manner as in Comparative Example 1. This fine powder (c) had a volume resistivity of $4.5 \times 10^8$ Ω·cm. Meanwhile, 100 parts by weight of particles of fine titanium oxide powder with a BET specific surface area of 95 $m^2$/g were surface-treated with 10 parts by weight of dimethylsilicone oil to prepare a negatively chargeable hydrophobic fine titanium oxide powder.

Then, 100 parts by weight of toner particles prepared in the same manner as in Example 1, 0.4 part by weight of the fine powder (c) and 1.0 part by weight of the negatively chargeable hydrophobic fine titanium oxide powder were blended to produce a toner.

Using the toner thus produced, a running evaluation test was made in the same manner as in Example 1 while replenishing the toner.

Results obtained are shown in Table 3.
Evaluation Method
(1) L/L running image density:

In an environment of low temperature and low humidity of 15° C./10% RH ("L/L", also in Tables 2 and 3), images with an image percentage of 6% were continuously printed, and image density at solid black areas was measured for 10th sheet, 50,000th sheet and 100,000th sheet images each. The image density was measured using a reflection densitometer RD918 (manufactured by Macbeth Co.).
(2) L/L running fog density:

In the environment of low temperature and low humidity of 15° C./10% RH (L/L), images with an image percentage of 6% were continuously printed, and reflectance (A) at solid white areas was measured for 10th sheet, 50,000th sheet and 100,000th sheet images each. Reflectance (B) of virgin paper was also measured. The value obtained by subtracting reflectance (A) from reflectance (B) was regarded as fog density. The reflectance was measured using TC-6DS (manufactured by Tokyo Denshoku)
(3) H/H running image density:

In an environment of high temperature and high humidity of 30° C./90% RH ("H/H", also in Tables 2 and 3), images with an image percentage of 6% were continuously printed, and image density at solid black areas was measured on 10th sheet, 50,000th sheet and 100,000th sheet images each.
(4) H/H running, first-in-the-morning fog density:

In the environment of high temperature and high humidity of 30° C./90% RH (H/H), images with an image percentage of 6% were continuously printed on 3,000 sheets of paper, and reflectance at solid white areas was measured for 10th sheet and 3,000th sheet images each. After standing in the same environment for 72 hours, the images with an image percentage of 6% were further printed on one sheet of paper (first-in-the-morning print), and the reflectance of its solid white area was measured.
(5) Transparency:

A sample is put on a glass plate, and is heated by a hot plate or the like. Once the sample has melted, another glass plate is overlaid on the first glass plate leaving a gap of 0.5 mm between the two, followed by cooling at room temperature. Using a magnetic spectrophotometer UV2200 (manufactured by Shimadzu Corp.), the transmittance of the sample is measured. Values at a wavelength of 650 nm in the case of magenta toner, 600 nm in the case of yellow toner and 500 nm in the case of cyan toner, were used. Here, the transmittance measured for a sample formed of toner particles is regarded as $I_0$, and the transmittance measured for a sample formed of toner particles having external additives is regarded as I, where $100 \times (I/I_0)$ is regarded as transparency.

TABLE 2

| | L/L running image density | | | L/L running fog density | | | H/H running image density | | | H/H running & first-in-the-morning fog density | | | Transparency | Remarks |
|---|---|---|---|---|---|---|---|---|---|---|---|---|---|---|
| | (1) | (2) | (3) | (1) | (2) | (3) | (1) | (2) | (3) | (1) | (4) | (5) | (%) | |
| Example: | | | | | | | | | | | | | | |
| 1 | 1.45 | 1.45 | 1.43 | 0.2 | 0.3 | 0.2 | 1.43 | 1.38 | 1.37 | 0.2 | 0.4 | 0.8 | — | (A) |
| 2 | 1.44 | 1.40 | 1.38 | 0.2 | 0.7 | 1.0 | 1.42 | 1.37 | 1.36 | 0.2 | 0.5 | 0.9 | — | (B) |
| 3 | 1.43 | 1.37 | 1.36 | 0.3 | 0.6 | 1.0 | 1.42 | 1.36 | 1.36 | 0.3 | 0.5 | 1.0 | — | (A) |
| 4 | 1.44 | 1.42 | 1.42 | 0.3 | 0.5 | 0.8 | 1.42 | 1.37 | 1.36 | 0.3 | 0.4 | 1.0 | — | (A) |
| 5 | 1.44 | 1.43 | 1.42 | 0.3 | 0.3 | 0.4 | 1.43 | 1.37 | 1.36 | 0.3 | 0.5 | 0.9 | — | (A) |
| 6 | 1.43 | 1.41 | 1.39 | 0.3 | 0.4 | 0.7 | 1.42 | 1.36 | 1.36 | 0.2 | 0.4 | 0.9 | — | (A) |
| 7 | 1.43 | 1.39 | 1.35 | 0.3 | 0.6 | 1.0 | 1.42 | 1.38 | 1.37 | 0.3 | 0.4 | 0.8 | — | (A) |
| 8 | 1.44 | 1.43 | 1.42 | 0.3 | 0.3 | 0.3 | 1.42 | 1.35 | 1.34 | 0.3 | 0.7 | 1.2 | — | (A) |
| 9 | 1.47 | 1.46 | 1.44 | 0.2 | 0.2 | 0.3 | 1.43 | 1.39 | 1.37 | 0.2 | 0.4 | 0.9 | — | (A) |
| 10 | 1.48 | 1.45 | 1.42 | 0.2 | 0.3 | 0.4 | 1.45 | 1.40 | 1.38 | 0.2 | 0.4 | 0.8 | — | — |
| 11 | 1.45 | 1.42 | 1.40 | 0.2 | 0.7 | 1.2 | 1.42 | 1.37 | 1.37 | 0.2 | 0.5 | 0.9 | — | — |
| 12 | 1.44 | 1.40 | 1.35 | 0.2 | 1.2 | 1.7 | 1.42 | 1.37 | 1.37 | 0.2 | 0.5 | 0.8 | — | (B) |
| 13 | | | | | | | | | | | | | | |

TABLE 2-continued

| | L/L running image density | | | L/L running fog density | | | H/H running image density | | | H/H running & first-in-the-morning fog density | | | Transparency | Remarks |
|---|---|---|---|---|---|---|---|---|---|---|---|---|---|---|
| | (1) | (2) | (3) | (1) | (2) | (3) | (1) | (2) | (3) | (1) | (4) | (5) | (%) | |
| C: | 1.85 | 1.83 | 1.83 | 0.2 | 0.2 | 0.2 | 1.90 | 1.86 | 1.85 | 0.2 | 0.5 | 0.9 | 99.5 | — |
| Y: | 1.84 | 1.83 | 1.82 | 0.2 | 0.3 | 0.3 | 1.91 | 1.86 | 1.85 | 0.2 | 0.4 | 1.0 | 99.4 | — |
| M: | 1.85 | 1.83 | 1.83 | 0.2 | 0.3 | 0.2 | 1.90 | 1.85 | 1.84 | 0.2 | 0.5 | 0.9 | 99.7 | — |
| B: | 1.85 | 1.82 | 1.82 | 0.2 | 0.2 | 0.3 | 1.89 | 1.85 | 1.84 | 0.2 | 0.6 | 0.8 | — | — |
| 14 | 1.85 | 1.82 | 1.82 | 0.2 | 0.2 | 0.3 | 1.88 | 1.85 | 1.82 | 0.2 | 0.8 | 1.3 | 98.3 | — |
| 15 | 1.83 | 1.81 | 1.80 | 0.3 | 0.3 | 0.5 | 1.88 | 1.84 | 1.81 | 0.2 | 0.9 | 1.5 | 92.4 | — |
| 16 | 1.45 | 1.44 | 1.43 | 0.2 | 0.3 | 0.3 | 1.43 | 1.37 | 1.37 | 0.2 | 0.5 | 0.7 | — | (A) |

(1): 10th sheet;
(2): 50,000th sheet;
(3): 100,000th sheet
(4): 3,000th sheet;
(5): First-in-the-morning sheet
C, Y, M, B: Cyan toner, Yellow toner, Magenta toner, Black toner
(A): No contamination of developing blade is seen.
(B): A little contamination of developing blade by tin oxide occurs on L/L 100,000th sheet

TABLE 3

| | L/L running image density | | | L/L running fog density | | | H/H running image density | | | H/H running & first-in-the-morning fog density | | | Transparency | Remarks |
|---|---|---|---|---|---|---|---|---|---|---|---|---|---|---|
| | (1) | (2) | (3) | (1) | (2) | (3) | (1) | (2) | (3) | (1) | (4) | (5) | (%) | |
| Comparative Example: | | | | | | | | | | | | | | |
| 1 | 1.45 | 1.25 | 1.01 | 0.2 | 4.5 | 6.8 | 1.38 | 1.27 | 1.11 | 2.7 | 3.3 | 6.7 | — | (C) |
| 2 | 1.46 | 1.30 | 1.17 | 0.2 | 4.7 | 6.4 | 1.35 | 1.26 | 1.15 | 3.5 | 5.4 | 9.8 | — | — |
| 3 | 1.46 | 1.15 | 0.92 | 0.2 | 5.7 | 8.9 | 1.26 | 1.19 | 1.15 | 3.0 | 4.9 | 9.0 | — | (D) |
| 4 | 1.46 | 1.17 | 0.96 | 0.3 | 5.3 | 7.9 | 1.37 | 1.30 | 1.21 | 2.7 | 4.1 | 5.9 | — | — |
| 5 | 1.44 | 1.27 | 1.19 | 0.2 | 4.7 | 6.5 | 1.39 | 1.30 | 1.20 | 1.5 | 2.5 | 4.8 | — | (B) |

(1): 10th sheet;
(2): 50,000th sheet;
(3): 100,000th sheet
(4): 3,000th sheet;
(5): First-in-the-morning sheet
(B): A little contamination of developing blade by tin oxide occurs on L/L 100,000th sheet
(C): Much contamination of developing blade by tin oxide occurs on L/L 50,000th sheet
(D): Very much contamination of developing blade by tin oxide occurs on L/L 50,000th sheet As described above, the fine powder used in the present invention, which is comprised of base particles on the surfaces of which coats of crystalline low electrical resistance tin oxide, can prevent image density from lowering and fog from occurring because of increase in charge quantity especially in an environment of low temperature and low humidity.

In addition, since the bond between the base particles and the coats is very strong, high-quality images can be maintained even in continuous service.

Since water adsorption is small, the charge quantity may less decrease even in an environment of high humidity, so that high-quality images can be provided.

What is claimed is:

1. A toner for developing an electrostatic image, which comprises:

(a) toner particles containing at least a binder resin and a colorant; and (b) a fine powder having base particles on the surfaces of which coats of crystalline low electrical resistance tin oxide are formed;

wherein said crystalline low electrical resistance tin oxide contains less than 100 ppm of antimony, arsenic and phosphorus and has an oxygen deficiency structure.

2. The toner according to claim 1, wherein said fine powder comprises base particles formed of fine barium sulfate particles.

3. The toner according to claim 1 or 2, wherein said fine powder has a volume resistivity of $1 \times 10^8$ Ω·cm or lower.

4. The toner according to claim 1, wherein said coats of crystalline low electrical resistance tin oxide are those formed by dispersing fine particles serving as the base particles, in a mineral acid solution of a hydrolyzable tin compound, thereafter raising the pH of the dispersion, and hydrolyzing the tin compound so that the surfaces of the fine particles are coated with tin hydroxide deposited on the fine particle surfaces, followed by calcining the resulting fine particles in an environment having a controlled oxygen concentration.

5. The toner according to claim 1, wherein said base particles have an average particle diameter of 1.5 μm or smaller.

6. The toner according to claim 1, wherein said base particles have an average particle diameter of from 0.05 μm to 0.9 μm.

7. The toner according to claim 1, wherein said fine powder has a volume resistivity of $1 \times 10^8$ Ω·cm or lower.

8. The toner according to claim 1, wherein said fine powder has a volume resistivity of from 1 Ω·cm to 1×Ω·cm.

9. The toner according to claim 1, wherein said base particles are coated with the low electrical resistance tin oxide in an amount of from 20/n to 320/n % by weight, where n represents a true specific gravity of the base particles.

10. The toner according to claim 1, wherein said toner particles have a weight average particle diameter of from 2 μm to 10 μm.

11. The toner according to claim 1, wherein said toner particles have a weight average particle diameter of from 3 μm to 9 μm.

12. An image forming method comprising;

forming an electrostatic image on an electrostatic image bearing member;

forming a thin layer of a toner on a developer carrying member by means of a coating member pressing the developer carrying member via the toner; and developing the electrostatic image by transferring the toner on the developer carrying member to the electrostatic image bearing member to form a toner image;

wherein said toner comprises;

(a) toner particles containing at least a binder resin and a colorant; and (b) a fine powder having base particles on the surfaces of which coats of crystalline low electrical resistance tin oxide are formed;

said crystalline low electrical resistance tin oxide containing less than 100 ppm of antimony, arsenic and phosphorus, and having an oxygen deficiency structure.

13. The method according to claim 12, wherein said fine powder comprises base particles formed of fine barium sulfate particles.

14. The method according to claim 12, wherein said fine powder has a volume resistivity of $1 \times 10^8$ Ω·cm or lower.

15. The method according to claim 12, wherein said coats of crystalline low electrical resistance tin oxide coat are those formed by dispersing fine particles serving as the base particles, in a mineral acid solution of a hydrolyzable tin compound, thereafter raising the pH of the dispersion, and hydrolyzing the tin compound so that the surfaces of the fine particles are coated with tin hydroxide deposited on the fine particle surfaces, followed by calcining the resulting fine particles in an environment having a controlled oxygen concentration.

16. The method according to claim 12, wherein said base particles have an average particle diameter of 1.5 μm or smaller.

17. The method according to claim 12, wherein said base particles have an average particle diameter of from 0.05 μm to 0.9 μm.

18. The method according to claim 12, wherein said fine powder has a volume resistivity of $1 \times 10^8$ Ω·cm or lower.

19. The method according to claim 12, wherein said fine powder has a volume resistivity of from 1 Ω·cm to $1 \times 10^6$ Ω·cm.

20. The method according to claim 12, wherein said base particles are coated with the low electrical resistance tin oxide in an amount of from 20/n to 320/n % by weight, where n represents a true specific gravity of the base particles.

21. The method according to claim 12, wherein said toner particles have a weight average particle diameter of from 2 μm to 10 μm.

22. The method according to claim 12, wherein said toner particles have a weight average particle diameter of from 3 μm to 9 μm.

23. The method according to claim 12, wherein said coating member is an elastic blade.

24. The method according to claim 12, wherein said coating member is an elastic roller.

* * * * *

UNITED STATES PATENT AND TRADEMARK OFFICE
CERTIFICATE OF CORRECTION

PATENT NO. : 5,614,344
DATED : March 25, 1997
INVENTOR(S) : HIROAKI KAWAKAMI ET AL.

It is certified that error appears in the above-indentified patent and that said Letters Patent is hereby corrected as shown below:

<u>COLUMN 4</u>

Line 32, "AS" should read --As--.

<u>COLUMN 19</u>

Line 12, "1 Ω.cm to 1xΩ.cm." should read --1 Ω.cm to $1 \times 10^6$ Ω.cm.--.

Signed and Sealed this

Eighteenth Day of November 1997

Attest:

BRUCE LEHMAN

*Attesting Officer*     *Commissioner of Patents and Trademarks*